United States Patent
Hasegawa et al.

(10) Patent No.: US 6,937,859 B2
(45) Date of Patent: Aug. 30, 2005

(54) MOBILE COMMUNICATION SERVICE CONTROL SYSTEM AND MOBILE COMMUNICATION SERVICE CONTROL METHOD

(75) Inventors: Tooru Hasegawa, Yokosuka (JP); Toyota Nishi, Yokosuka (JP); Akira Kaiyama, Yokohama (JP); Takeshi Sugiyama, Yokosuka (JP); Hironari Kobayashi, Iruma (JP); Hiroshi Matsunaga, Yokosuka (JP); Kazuyuki Kozu, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 532 days.

(21) Appl. No.: 10/014,663

(22) Filed: Dec. 14, 2001

(65) Prior Publication Data

US 2002/0077100 A1 Jun. 20, 2002

(30) Foreign Application Priority Data

Dec. 15, 2000 (JP) ........................................ 2000-382772

(51) Int. Cl.⁷ ................................................. H04Q 7/20
(52) U.S. Cl. ...................... 455/433; 455/428; 455/445; 455/414.1; 455/432.1; 455/414.3; 455/461
(58) Field of Search .............................. 455/433, 414.1, 455/428, 432.1, 445, 414.3, 461

(56) References Cited

U.S. PATENT DOCUMENTS

| | | | |
|---|---|---|---|
| 5,680,440 A | * | 10/1997 | Ghisler et al. ........... 455/432.1 |
| 5,920,820 A | | 7/1999 | Qureshi et al. |
| 6,032,043 A | | 2/2000 | Houde |
| 6,085,105 A | | 7/2000 | Becher |
| 6,101,387 A | * | 8/2000 | Granberg et al. ........... 455/433 |
| 6,128,389 A | * | 10/2000 | Chan et al. .................. 380/247 |
| 6,148,197 A | * | 11/2000 | Bridges et al. .......... 455/432.3 |
| 6,154,644 A | | 11/2000 | Murray |
| 6,185,198 B1 | * | 2/2001 | LaDue ........................ 370/329 |
| 6,195,543 B1 | * | 2/2001 | Granberg ..................... 455/407 |
| 6,628,950 B2 | * | 9/2003 | Verkama et al. ............. 455/445 |
| 6,633,755 B1 | * | 10/2003 | Haumont ..................... 455/406 |
| 6,684,069 B1 | * | 1/2004 | Yoon ........................ 455/414.1 |

FOREIGN PATENT DOCUMENTS

| | | |
|---|---|---|
| EP | 0 889 658 | 1/1999 |
| EP | 0 928 120 | 7/1999 |
| WO | WO 98/59507 | 12/1998 |
| WO | WO 99/51041 | 10/1999 |
| WO | WO 00/25528 | 5/2000 |

OTHER PUBLICATIONS

T. Hasegawa, et al., 7th International Conference on Intelligence in next generation Networks, pp. 210–215, "Service Control Communication Method in the IMT–2000 Network", Oct. 1–4, 2001.

* cited by examiner

Primary Examiner—Sonny Trinh
Assistant Examiner—Huy Phan
(74) Attorney, Agent, or Firm—Oblon, Spivak, McClelland, Maier & Neustadt, P.C.

(57) ABSTRACT

A mobile communication service control system according to the present invention has a home location register 13 storing subscriber information, a switching unit 12 for sending a subscriber information inquiry signal 201 to the register 13, and a service control unit 14 for controlling a service provided for subscribers. The home location register 13 stores service information 309 necessary for a start of control of the service at the service control unit 14 and sends the service information 309 along with a response signal 308 to the subscriber information inquiry signal 201 to the switching unit 12. The switching unit 12 transfers the service information 309 received from the register 13, to the service control unit 14.

15 Claims, 5 Drawing Sheets

MOBILE COMMUNICATION SERVICE CONTROL SYSTEM AND MOBILE COMMUNICATION SERVICE CONTROL METHOD

BACKGROUND OF THE INVENTION

1. Field of the Invention

The present invention relates to a mobile communication service control system and a mobile communication service control method for starting control of services by cooperation of a home location register storing subscriber information and a service control unit for controlling the services provided for subscribers.

2. Related Background Art

In the field of mobile communication networks, attempts have been made to construct as separate units the home location register for managing locations of mobile terminals and originating/terminating, and the service control unit for controlling the services provided for subscribers. In addition, attempts have also been made to control the services both at the service control unit and at the home location register.

SUMMARY OF THE INVENTION

The conventional networks as described above, however, had the following problem. Namely, when the service control unit starts (or executes) a service controlled thereat, it sometimes necessitates information stored at the home location register. For example, there may be cases where the home location register controls "Caller ID Display Request Service," the service control unit controls "Voice Mail Service," and the former caller ID display request service is more preferentially applied than the latter voice mail service. In such cases, prior to a start of execution of the voice mail service, the service control unit must inquire of the home location register information, e.g., about whether the caller ID display request service managed at the home location register is on, or whether the caller ID display request service is activated to end a call from a caller with ID Display off.

This inquiry increases the number of signals transmitted between the home location register and the service control unit, which was the hindrance to the separate structure of the two units.

The present invention has been accomplished in order to solve the above problem and an object of the invention is to provide a mobile communication service control system and a mobile communication service control method in which the service control unit does not have to inquire of the home location register the information necessary for the start of control of the service.

In order to achieve the above object, a mobile communication service control system of the present invention comprises a home location register storing subscriber information; a switching unit for transmitting to the home location register a subscriber information inquiry signal to inquire about the subscriber information upon processing of an incoming call; and a service control unit for controlling a service provided for subscribers, wherein the home location register stores service information necessary for the service control unit's starting control of the service, and sends to the switching unit the service information along with a response signal to the subscriber information inquiry signal, wherein the switching unit transfers the service information received from the home location register, to the service control unit, and wherein the service control unit starts the control of the service when receiving the service information from the switching unit.

According to the mobile communication service control system of the present invention, the switching unit first sends the subscriber information inquiry signal about a calling subscriber to the home location register upon processing of an incoming call. Then the home location register sends to the switching unit the service information necessary for the service control unit's starting the control of the service, along with the response signal to the inquiry signal. This service information is transferred from the switching unit to the service control unit and the service control unit starts the control of the service, based on the service information. In the present invention, as described above, the service control unit is able to start the control of the service without inquiring of the home location register the necessary information.

In the mobile communication service control system of the present invention, it is preferable to employ a configuration wherein when a service available for a subscriber is on, the service control unit sends a service on signal to the home location register and wherein only when the home location register receives the subscriber information inquiry signal in a received state of the service-on-signal, the home location register sends to the switching unit the service information along with the response signal to the subscriber information inquiry signal.

When the system is employed in the foregoing configuration, the home location register sends the service information through the switching unit to the service control unit only on occasions when the service control unit necessitates the service information; therefore, this configuration is able to avoid transmission of unnecessary information between the home location register, the switching unit, and the service control unit.

Further, in the mobile communication service control system of the present invention, it is preferable to employ a configuration wherein the home location register controls a predetermined register-side service and incorporates information about whether the register-side service is on, into the aforementioned service information, wherein the service-control unit stores priority data indicating which is to be more preferentially started to control between the register-side service controlled at the home location register and the foregoing service controlled at the service control unit, and wherein the service control unit determines a service to be started to control, based on the service information and the priority data.

Under the circumstances where the home location register and the service control unit both control their respective services, it is necessary to determine which service is to be first started to control. When the service information includes the information about whether the register-side service at the home location register is on and when reference is made to the priority data, the service control unit is able to determine which service is to be first started to control.

When the system is constructed in the configuration wherein the home location register sends the service information to the switching unit only when receiving the subscriber information inquiry signal in the received state of the service-on-signal as described above, it is further preferable to employ a configuration wherein the home location register controls a predetermined register-side service, wherein the service information indicates whether the register-side service controlled at the home location register is on, and wherein when the service information indicates that the register-side service is on, the service control unit, having received the service information, controls the register-side service in place of the home location register.

In this case, when it is determined that the service control unit needs to control the register-side service, the service control unit itself is able to start the control of the register-side service, which obviates the necessity for transmitting information in order to establish contact with the home location register.

In this case, a further preferred configuration is such that the service control unit controls at least a service with a higher priority for a start of control than that of the register-side service, that the service information indicates whether the register-side service controlled at the home location register is on, and that when the service information indicates that the register-side service is on, the service control unit, having received the service information, controls the register-side service in place of the home location register after the service control unit confirms that the service with the higher priority for the start of control than that of the register-side service is off or when a telecommunications circuit is still maintained after completion of the control of the service with the higher priority.

When the service control unit controls the service with the higher priority for the start of control than that of the register-side service, the home location register is not allowed to start the control of the register-side service without determining whether the service with the higher priority is to be controlled. In the present invention, in consideration of such circumstances, the home location register sends the service information indicating whether the register-side service controlled at the home location register is on, through the switching unit to the service control unit. Then the subjective unit for controlling the register-side service is changed from the home location register to the service control unit, and the service control unit starts the control of the register-side service and the service to be controlled by itself from the beginning, in accordance with their priorities. Accordingly, the service control unit receiving the service information is able to provide each service for the subscribers, without inquiring of the home location register the other information at all.

In this case, the system may also be further constructed in such a configuration that the register-side service controlled at the home location register is a service of disconnecting a telecommunications circuit unless a caller's mobile communication terminal displays its own phone number and that the service with the higher priority for the start of control than that of the register-side service, controlled at the service control unit, is a service of disconnecting a telecommunications circuit when a phone number of a caller's mobile communication terminal coincides with a predetermined phone number.

The system may also be constructed in such a configuration that when the home location register receives the subscriber information inquiry signal without reception of the service-on-signal, the home location register controls the register-side service without sending the service information to the switching unit.

In the mobile communication service control system of the present invention, it is further preferable to employ a configuration wherein the service information is accompanied by a specific identifier indicating succession of the service information and by data length information about a data length of the service information and wherein when the switching unit determines that the information received from the home location register includes the specific identifier, the switching unit transfers information successive to the data length information by the data length, to the service control unit.

In this case, the switching unit does not have to check the contents of the service information, so that the load can be reduced on the switching unit. Even in the case wherein the system is modified so as to be able to control a new service at the service control unit, there is no need for modification of the switching unit, because the switching unit does not check the contents of the service information.

A mobile communication service control method of the present invention is a method of controlling a service by cooperation of a home location register storing subscriber information, a switching unit for sending to the home location register a subscriber information inquiry signal to inquire about the subscriber information upon processing of an incoming call, and a service control unit for controlling a service provided for subscribers, wherein the home location register stores service information necessary for the service control unit's starting control of the service and sends to the switching unit the service information along with a response signal to the subscriber information inquiry signal, wherein the switching unit transfers the service information received from the home location register, to the service control unit, and wherein the service control unit starts the control of the service when receiving the service information from the switching unit.

According to the mobile communication service control method of the present invention, the switching unit first sends the subscriber information inquiry signal about a calling subscriber to the home location register upon processing of an incoming call. Then the home location register sends to the switching unit the service information necessary for the service control unit's starting the control of the service, along with the response signal to the inquiry signal. This service information is transferred from the switching unit to the service control unit and the service control unit starts the control of the service, based on the service information. In the present invention, as described above, the service control unit is able to start the control of the service without inquiring of the home location register the necessary information.

In the mobile communication service control method of the present invention, it is preferable to employ a configuration wherein when a service available for a subscriber is on, the service control unit sends a service-on-signal to the home location register and wherein only when the home location register receives the subscriber information inquiry signal in a received state of the service-on-signal, the home location register sends to the switching unit the service information along with the response signal to the subscriber information inquiry signal.

When the method is employed in the foregoing configuration, the home location register sends the service information through the switching unit to the service control unit only on occasions when the service control unit necessitates the service information; therefore, this configuration is able to avoid transmission of unnecessary information between the home location register, the switching unit, and the service control unit.

Further, in the mobile communication service control method of the present invention, it is preferable to employ a configuration wherein the home location register controls a predetermined register-side service and incorporates information about whether the register-side service is on, into the aforementioned service information, wherein the service control unit stores priority data indicating which is to be more preferentially started to control between the register-side service controlled at the home location register and the foregoing service controlled at the service control unit, and wherein the service control unit determines a service to be started to control, based on the service information and the priority data.

Under the circumstances where the home location register and the service control unit both control their respective services, it is necessary to determine which service is to be first started to control. When the service information includes the information about whether the register-side service at the home location register is on and when reference is made to the priority data, the service control unit is able to determine which service is to be first started to control.

When the method is adapted to send the service information to the switching unit only when the home location register receives the subscriber information inquiry signal in the received state of the service-on-signal as described above, it is further preferable to employ a configuration wherein the home location register controls a predetermined register-side service, wherein the service information indicates whether the register-side service controlled at the home location register is on, and wherein when the service information indicates that the register-side service is on, the service control unit, having received the service information, controls the register-side service in place of the home location register.

In this case, when it is determined that the service control unit needs to control the register-side service, the service control unit itself is able to start the control of the register-side service, which obviates the necessity for transmitting information in order to establish contact with the home location register.

In this case, a further preferred configuration is such that the service control unit controls at least a service with a higher priority for a start of control than that of the register-side service, that the service information indicates whether the register-side service controlled at the home location register is on, and that when the service information indicates that the register-side service is on, the service control unit, having received the service information, controls the register-side service in place of the home location register after the service control unit confirms that the service with the higher priority for the start of control than that of the register-side service is off or when a telecommunications circuit is still maintained after completion of the control of the service with the higher priority.

When the service control unit controls the service with the higher priority for the start of control than that of the register-side service, the home location register is not allowed to start the control of the register-side service without determining whether the service with the higher priority is to be controlled. In the present invention, in consideration of such circumstances, the home location register sends the service information indicating whether the register-side service controlled at the home location register is on, through the switching unit to the service control unit. Then the subjective unit for controlling the register-side service is changed from the home location register to the service control unit, and the service control unit starts the control of the register-side service and the service to be controlled by itself from the beginning, in accordance with their priorities. Accordingly, the service control unit receiving the service information is able to provide each service for the subscribers, without inquiring of the home location register the other information at all.

In this case, the method may also be further added to such a configuration that the register-side service controlled at the home location register is a service of disconnecting a telecommunications circuit unless a caller's mobile communication terminal displays its own phone number and that the service with the higher priority for the start of control than that of the register-side service, controlled at the service control unit, is a service of disconnecting a telecommunications circuit when a phone number of a caller's mobile communication terminal coincides with a predetermined phone number.

The method may also be adapted to such a configuration that when the home location register receives the subscriber information inquiry signal without reception of the service-on-signal, the home location register controls the register-side service without sending the service information to the switching unit.

In the mobile communication service control method of the present invention, it is further preferable to employ a configuration wherein the service information is accompanied by a specific identifier indicating succession of the service information and by data length information about a data length of the service information and wherein when the switching unit determines that the information received from the home location register includes the specific identifier, the switching unit transfers information successive to the data length information by the data length, to the service control unit.

In this case, the switching unit does not have to check the contents of the service information, so that the load can be reduced on the switching unit. Even in the case wherein the method is modified so as to be able to control a new service at the service control unit, there is no need for modification of the switching unit, because the switching unit does not check the contents of the service information.

BRIEF DESCRIPTION OF THE DRAWINGS

The present invention may be more readily described with reference to the accompanying drawings, in which.

DESCRIPTION OF THE PREFERRED EMBODIMENTS

Preferred embodiments of the mobile communication service control system and mobile communication service control method according to the present invention will be described below in detail with reference to the accompanying drawings. It is noted that the same elements will be denoted by the same reference symbols and redundant description will be omitted.

Figure 1:
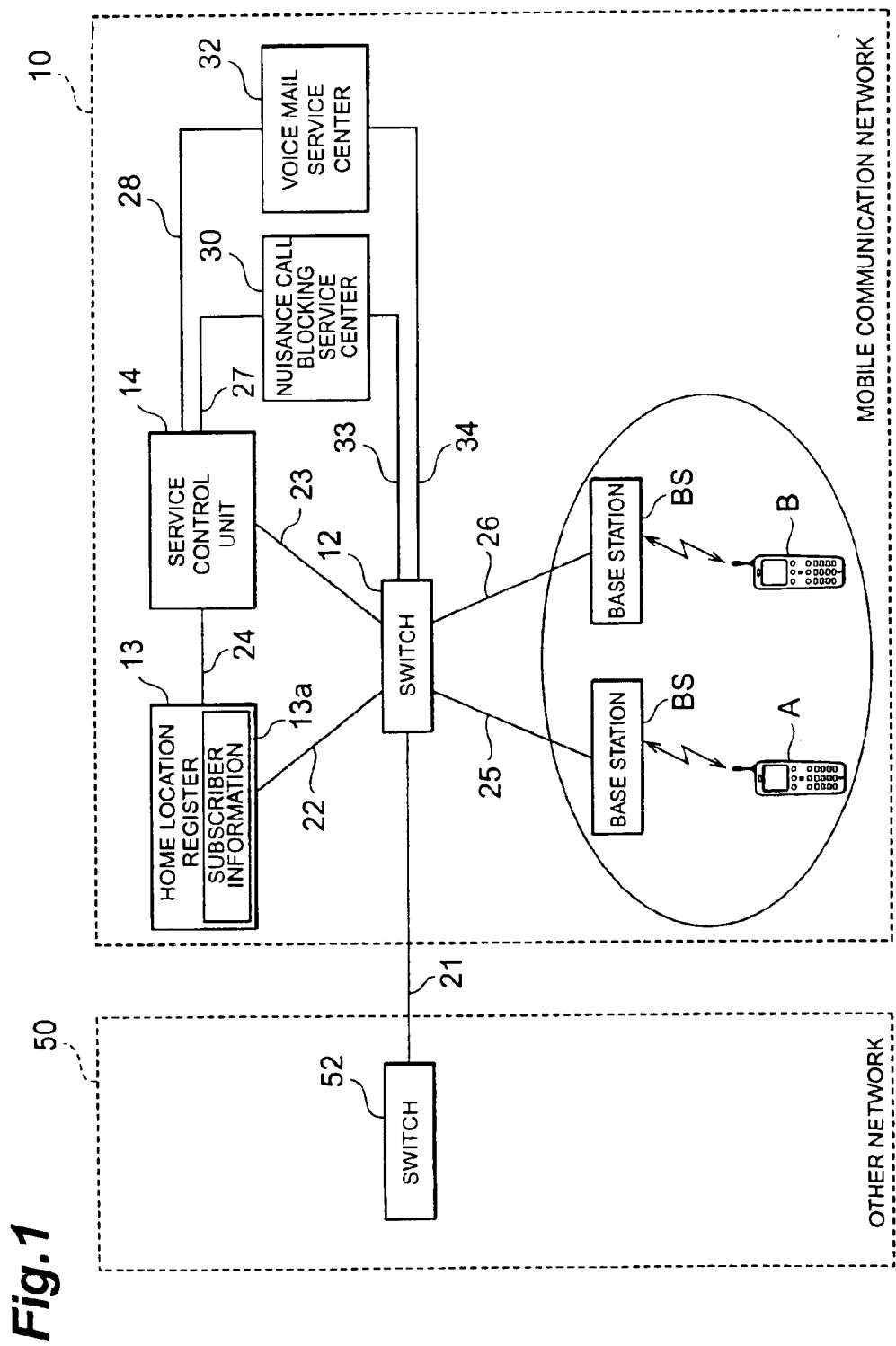
FIG. 1 is a block diagram showing a mobile communication network to which the mobile communication service control system of the present invention is applied.

FIG. 1 is a block diagram showing a mobile communication network 10 to which the mobile communication service control system of the present embodiment is applied. The mobile communication network 10 is provided with a switching unit 12 connected through telecommunications circuits 25, 26 to a plurality of base stations BS; a home location register (HLR) 13 storing various information about subscribers registered for use of the network 10 and connected through a telecommunications circuit 22 to the switching unit 12; and a service control unit 14 configured to control services provided for subscriber's mobile terminals and connected through a telecommunications circuit 23 to the switching unit 12. The home location register 13 is connected through a telecommunications circuit 24 to the service control unit 14.

The switching unit 12 is connected through a telecommunications circuit 21 to a switching unit 52 of another network 50. Communication signals are transmitted between the switching unit 12 and the switching unit 52 whereby it becomes feasible to implement communications between subscriber's mobile terminals of other network 50 and subscriber's mobile terminals of the mobile communication network 10.

A subscriber information memory area 13a is prepared at the home location register 13. This subscriber information memory area 13a stores information about contracts of respective subscribers, information about locations of respective subscriber's terminals, information about selection of various services, and so on. The subscriber information memory area 13a also stores information about whether calling of each subscriber is suspended for some reason, e.g., because of nonpayment of charges. Further, the home location register 13 has such a function that when there arises an incoming request to a subscriber's mobile terminal under suspension of service, the home location register 13 provides an announcement to tell the fact of service suspension, which was prerecorded as sound data, for a caller's mobile terminal and thereafter makes the switching unit 12 end the call. Let us employ a concept that the determination on suspension of service is one of services, in the following description.

Further, the home location register 13 controls the so-called "Caller ID Display Request Service" by which a call is ended after an announcement of a request for caller ID Display is provided for a caller of a mobile communication terminal with Caller ID Display off. The subscriber information memory area 13a stores information about whether each subscriber sets this service on.

The service control unit 14 is connected through a telecommunications circuit 27 to a nuisance call blocking service center 30 and through a telecommunications circuit 28 to a voice mail service center 32. The nuisance call blocking service center 30 is also connected through a telecommunications circuit 33 to the switching unit 12 and the voice mail service center 32 is connected through a telecommunications circuit 34 to the switching unit 12. The nuisance call blocking service center 30 performs a service of blocking a call when receiving an incoming request from a phone number designated by each subscriber. The nuisance call blocking service center 30 manages information about whether each subscriber sets this service on, phone numbers as objects for blocking calls, and so on. The voice mail service center 32 performs a service of recording a message of a caller in a voice memory when the power of a recipient's mobile terminal is off or when the recipient's mobile terminal is outside the service area. The voice mail service center 32 manages information about whether each subscriber sets this service on, and other information.

In the present embodiment, the service control unit 14 does not execute the services by itself but controls the services at the respective service centers 30, 32 as a general rule. However, the service control unit 14 acquires the information about whether each subscriber sets the respective services on, through the telecommunications circuits 27, 28 from the service centers 30, 32. Further, when at least one service either at the nuisance call blocking service center 30 or at the voice mail service center 32 is on, the service control unit 14 sends a "service-on-signal" through the telecommunications circuit 24 to the home location register 13 in order to inform the home location register 13 of the on condition of the service.

In the present embodiment, as described above, the home location register 13 and the service control unit 14 both control the services, and a relation among the services will be described below.

Figure 2:
FIG. 2 is a diagram showing priority data stored at the service control unit.

First, the services managed at the home location register 13 include the determination of service suspension and the caller ID display request service, and the services controlled at the service control unit 14 include the nuisance call blocking service and the voice mail service. An order of application of these four services is (1) service suspension determination (controlled at HLR), (2) nuisance call blocking service (controlled at the service control unit), (3) caller ID display request service (controlled at HLR; register-side service), and (4) voice mail service (controlled at the service control unit). Data concerning the order of preferentially starting (or executing) the control of either of these services is preliminary stored as priority data 11 as shown in FIG. 2, at the service control unit 14. There is also a situation in which the service control unit 14 controls the caller ID display request service (register-side service) in place of the home location register 13, and this will be described in the section of operation hereinafter.

It is seen from the above priority order of the services that, for example, the control of (4) voice mail service controlled at the service control unit 14 is started based on the premise that a call is still maintained after completion of the services of (1) to (3). Among these three services, (1) service suspension determination and (3) caller ID display request service are controlled at the home location register 13, and the service control unit 14 holds no information about whether these services are on. Therefore, the service control unit 14 needs to capture the information about whether the caller ID display request service of a recipient subscriber is on, as "service information," prior to the start of the control of the voice mail service. The process of the service control unit 14 acquiring this service information will be detailed later. In other words, the home location register 13 is not allowed to start the control of the caller ID display request service of (3), without checking whether the control of the nuisance call blocking service of (2) with the higher priority for the start of control is to be executed. A solution to this issue will also be described later.

Figure 3:
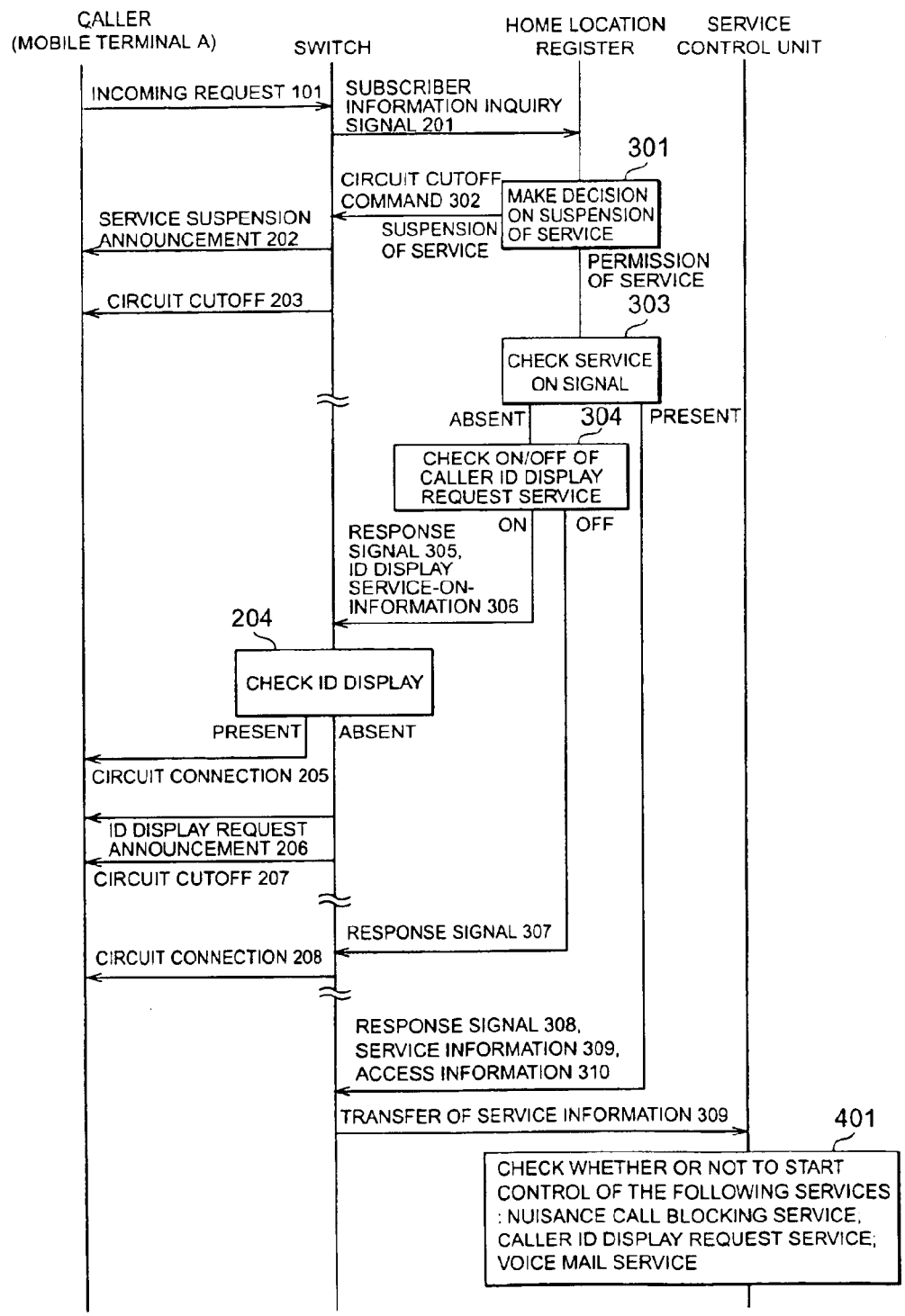
FIG. 3 is a chart showing an operation sequence of the mobile communication service control system of the present invention.

The above described the configuration of the mobile communication network 10 to which the mobile communication service control system of the present embodiment was applied. The mobile communication service control method of the present embodiment will be described below with reference to the operation sequence shown in FIG. 3.

When a mobile terminal A issues an incoming request 101 into a mobile terminal B of a subscriber of the mobile communication network 10, the switching unit 12 first sends a subscriber information inquiry signal 201 for an inquiry about the subscriber information of the mobile terminal B through the telecommunications circuit 22 to the home location register 13.

Receiving this subscriber information inquiry signal 201, the home location register 13 makes a determination 301 of whether the mobile terminal B is under suspension of service for some reason, e.g., because of nonpayment of charges. When the mobile terminal B is under suspension of service, the home location register 13 sends a call cutoff command 302 as a response signal to the subscriber information inquiry signal 201 through the telecommunications circuit 22 to the switching unit 12, and the switching unit 12 supplies an announcement 202 of service suspension recorded at the home location register 13, to the mobile terminal A and thereafter cuts off the circuit (203).

When the determination 301 is permission of calling on the other hand, the home location register 13 determines whether the aforementioned "service-on-signal" is received from the service control unit 14 (303). Namely, the home location register 13 determines whether at least one of the services controlled at the service control unit 14 is on.

When it is then determined from no reception of the service-on-signal that the mobile terminal B uses neither of the nuisance call blocking service and the voice mail service, the home location register 13 determines whether the caller ID display request service (register-side service) is to be applied (or whether the control thereof is to be started) (304).

When the caller ID display request service is on at the recipient's mobile terminal B, the home location register 13 first starts the control of the caller ID display request service to send ID display service-on-information 306 along with a response signal 305 to the subscriber information inquiry signal 201, including the information about the location of the mobile terminal B and others, through the telecommunications circuit 22 to the switching unit 12. Receiving the ID display service-on-information 306, the switching unit 12 checks whether ID display is on at the mobile terminal A (204). With ID display on, the circuit is connected between the mobile terminal A and the mobile terminal B (205) to permit a call between them. On the other hand, when ID display is off at the mobile terminal A, the switching unit feeds an ID display request announcement 206 recorded at the home location register 13 to the mobile terminal A and thereafter cuts off the circuit (207). Instead of the configuration wherein the switching unit 12 checks on/off of ID display, it is also possible to employ another configuration wherein the switching unit sends information about on/off of ID display along with the subscriber information inquiry signal 201 to the home location register 13 and wherein, in the case of ID display off, the home location register 13 issues a command to disconnect the circuit to the switching unit 12.

When at step 304 the recipient's mobile terminal B sets the caller ID display request service off on the other hand, the home location register 13 sends only the response signal 307 to the subscriber information inquiry signal 201, to the switching unit 12, and the switching unit 12 connects the circuit between the mobile terminal A and the mobile terminal B (208).

Described below is the operation carried out at step 303 when the home location register 13 receives the service-on-signal from the service control unit 14.

When receiving the service-on-signal, the home location register 13 sends service information 309 and access information 310 along with a response signal 308 to the subscriber information inquiry signal 201 to the switching unit 12. This service information 309 includes information about whether the caller ID display request service is on at the mobile terminal B. The access information 310 includes information indicating the reception of the service-on-signal at the home location register 13, an address of the service control unit in charge of the control of the service, information indicating a timing of access to the service control unit, and so on. The home location register 13 is not notified of which is on between the nuisance call blocking service and the voice mail service controlled at the service control unit 14. The home location register 13 is merely notified of the address of the service control unit.

Receiving the service information 309, the switching unit 12 transfers the service information 309 through the telecommunications circuit 23 to the service control unit 14 with reference to the address included in the access information. On this occasion, the switching unit 12 sends on/off of ID display at the mobile terminal A and the phone number thereof to the service control unit 14. Receiving the service information 309, the service control unit 14 then determines whether control of either the nuisance call blocking service, the caller ID display request service, or the voice mail service is to be started (or executed) (401).

Figure 4:
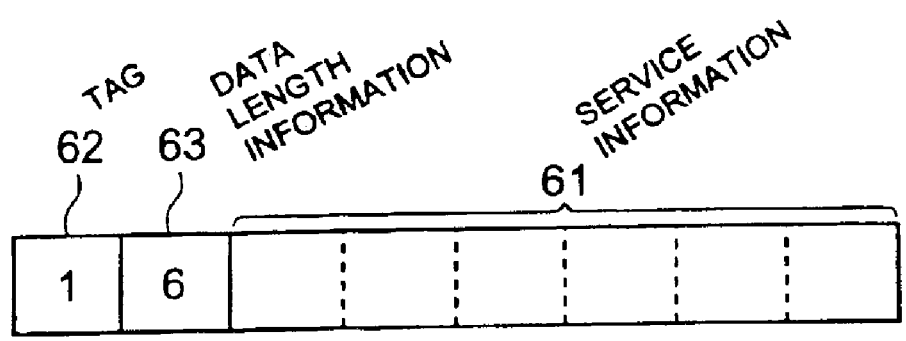
FIG. 4 is a diagram showing a configuration of service information.

The process of transferring the service information from the switching unit 12 will be described below with reference to FIG. 4. FIG. 4 is a diagram showing a schematic configuration of the service information. The service information 61 is accompanied by a tag 62 indicating succession of the service information and by information 63 indicating a data length of the service information 61. The tag 62 is placed, for example, at the leading end of each information sent from the home location register 13 to the switching unit 12. When the information is the service information 61, the tag 62 is a specific identifier indicating information of "1." The data length information 63 is information successive to the tag 62 and, in the example of FIG. 4, the data length of the service information 61 is "6."

When the switching unit 12 determines that the information received from the home location register 13 includes the specific identifier (the tag indicating the information of "1"), it transfers the information successive to the data length information 63 by the data length thereof, to the service control unit 14. Namely, the switching unit 12 transfers the service information to the service control unit 14, based on only the specific identifier and the data length information. For this reason, the switching unit 12 does not have to check the contents of the service information 61, which can reduce the load on the switching unit 12. Even in the case wherein the system is modified so as to be able to control a new service at the service control unit 14, the switching unit 12 does not have to be modified, because the switching unit 12 does not check the contents of the service information 61.

Figure 5:
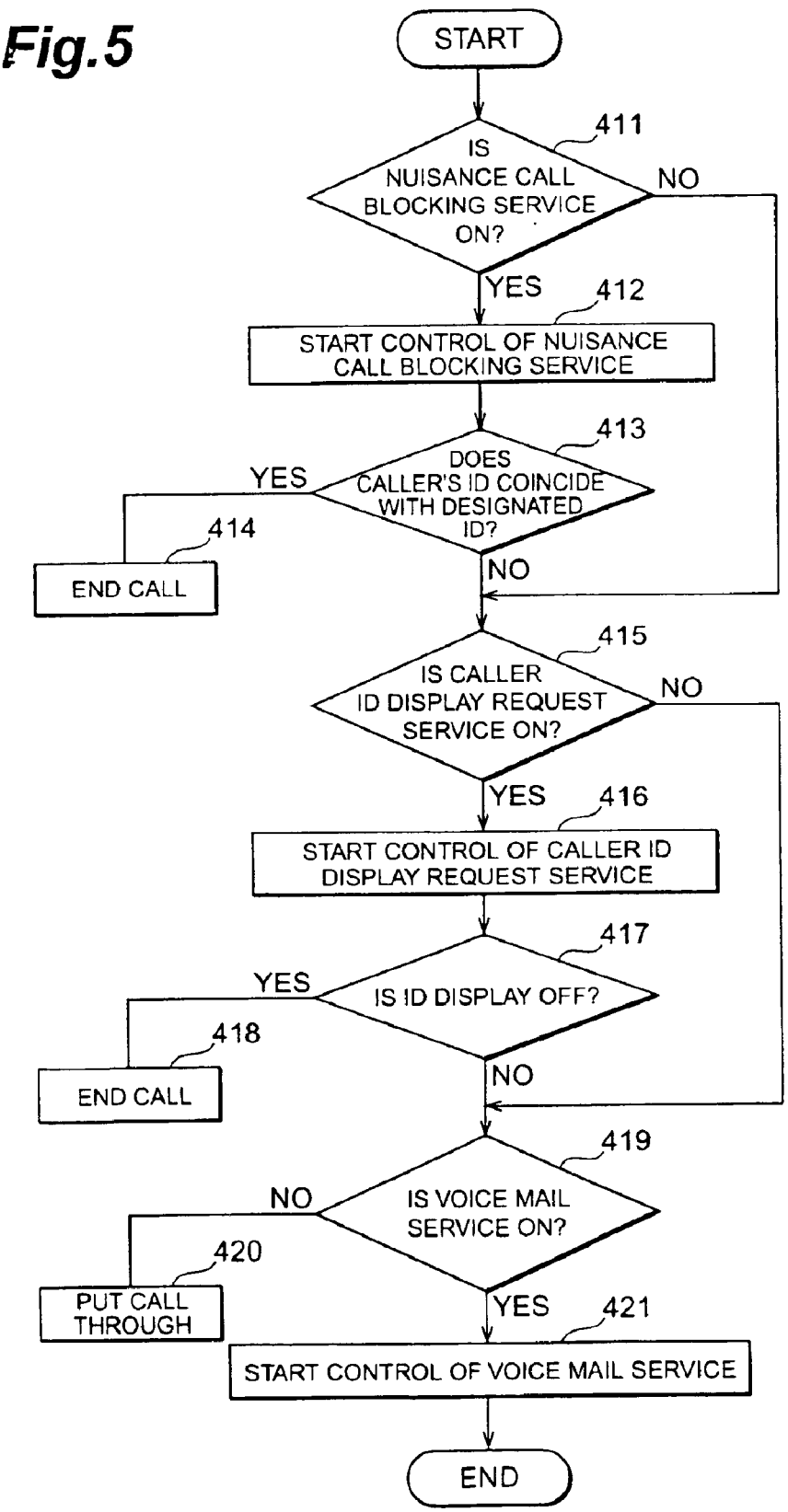
FIG. 5 is a flowchart showing a process of controlling services at the service control unit.

The process of controlling the services provided will be described below with reference to the flowchart of FIG. 5. The service control unit 14 stores the priority data (cf. FIG. 2) indicating the order of preferentially starting the control of either of the services, as described above, and in the present embodiment the system is configured to preferentially start (or execute) the control in the order of (1) service suspension determination, (2) nuisance call blocking service, (3) caller ID display request service (register-side service), and (4) voice mail service. However, the service suspension determination (1) is excepted from objects for checking the order of control start, because arrival at step 401 is based on the premise that the mobile terminal B is not under suspension of service. Accordingly, the service control unit 14 determines whether control is to be started for the three services, (2) nuisance call blocking service, (3) caller ID display request service, and (4) voice mail service.

At first step 411, the service control unit 14 determines whether the nuisance call blocking service is on at the mobile terminal B. When the service is on, the service control unit 14 makes access to the nuisance call blocking service center 30 to start the control of the service (step 412). Namely, the nuisance call blocking service is executed. On this occasion, the service control unit 14 sends the information about the phone number of the mobile terminal A to the nuisance call blocking service center 30. Then the nuisance call blocking service center 30 determines whether the phone number of the mobile terminal A coincides with either of phone numbers preliminary designated by the subscriber of the mobile terminal B (step 413). When the phone number coincides with one, the service center 30 supplies an announcement of rejection to the mobile terminal A and thereafter makes the switching unit 12 and the call (step 414).

When the caller's phone number coincides with neither at step 413 on the other hand, or when it is determined at step 411 that the nuisance call blocking service is off, the service control unit 14 determines at step 415 whether the caller ID display request service is on at the mobile terminal B. This determination is made based on the service information received from the switching unit 12. When it is determined from the service information that the caller ID display request service is on at the mobile terminal B, the service control unit 14 starts the control of the caller ID display request service (register-side service) in place of the home location register 13 (step 416). The service control unit 14 first determines whether ID Display is off at the mobile terminal A (step 417). In the case of ID Display off, the service control unit feeds the caller ID display request announcement to the mobile terminal A and thereafter makes the switching unit 12 disconnect the circuit (step 418).

When at step 417 ID Display is on at the mobile terminal A on the other hand, or when it is determined at step 415 that the caller ID display request service is off, the service control unit 14 determines at step 419 whether the voice mail service is on at the mobile terminal B. When the service is off, the service control unit 14 issues a command of normal circuit connection processing to the switching unit 12 (step 420). When the voice mail service is on at the mobile terminal B on the other hand, the control of the voice mail service is started (step 421). When this control of the voice mail service is started and when a predetermined condition is met, e.g., when the location of the mobile terminal B is outside the service area, when the power is off at the mobile terminal B, or the like, the caller of the mobile terminal A is allowed to leave a message in the voice memory at the voice mail service center 32.

The above described the process of controlling the services at the service control unit 14. In the mobile communication service control system of the present embodiment, the home location register 13 sends to the switching unit 12 the service information (the information about whether the caller ID display request service is on) 309 along with the response signal 308 to the subscriber information inquiry signal 201 from the switching unit 12 (cf. FIG. 3), and the switching unit 12 transfers this information to the service control unit 14. This service information 309 is information necessary for starting the control of the voice mail service controlled at the service control unit 14.

Then the service control unit 14 determines which service is to be started to control, based on the service information and the priority data. For this reason, the service control unit 14 is able to start the control of each service without inquiring of the home location register 13 through the telecommunications circuit 24 about the information on whether the caller ID display request service is on, which can largely decrease the number of signals transmitted between the service control unit 14 and the home location register 13. Therefore, there is no hindrance to construction of the home location register 13 and the service control unit 14 as separate units.

Since the service control unit 14 controls the nuisance call blocking service with the higher priority for the start of control than that of the caller ID display request service (register-side service) controlled at the home location register 13, the home location register 13 is not allowed to start the control of the register-side service without determining whether the nuisance call blocking service with the higher priority is to be controlled. In the present embodiment, the home location register 13 sends the service information indicating whether the caller ID display request service (register-side service) controlled at the home location register 13 is on, via the switching unit 12 to the service control unit 14. Then the subjective unit for controlling the register-side-service is changed from the home location register 13 to the service control unit 14, and the service control unit 14 starts the control of the services including the nuisance call blocking service and others, which are to be controlled by itself from the beginning, and the caller ID display request service (register-side service) according to their priorities. Accordingly, the service control unit 14, having received the service information, is able to provide each service for the subscribers, without inquiring of the home location register 13 any other information at all.

Further, when a new service is added to the mobile communication network 10 or when the substance of an existing service is modified, the structure of the home location register 13 and the service control unit 14 as separate units permits the system to be modified by adding the new service only to the service control unit 14 or by carrying out a work of modifying the substance of the existing service, which makes it feasible to implement the addition of the new service or the modification of the service substance at low cost and at once. Since the home location register 13 and the service control unit 14 are the separate units, even if the service control unit 14 becomes out of order, it will be feasible to provide the services controlled at only the home location register 13, for subscriber's terminals, which can enhance the reliability of the network.

In the present embodiment, the home location register 13 is configured so that, only when the home location register 13 receives the subscriber information inquiry signal in the received state of the service-on-signal from the service control unit 14, it sends to the switching unit 12 the service information along with the response signal to the subscriber information inquiry signal. Namely, the service information is not transferred to the service control unit 14 when the nuisance call blocking service and the voice mail service both are off. For this reason, the home location register 13 sends the service information through the switching unit 12 to the service control unit 14 only when the service control unit 14 necessitates the service information. This can avoid the situation of transmission of unnecessary information between the home location register 13, the switching unit 12, and the service control unit 14.

The above specifically described the invention accomplished by the inventors, on the basis of the embodiments thereof, but it is to be understood that the present invention is not limited to the above embodiments. For example, the home location register needs to store the service information, but does not always have to control the service by itself. Further, the home location register 13 may also be configured to send the service information along with the response signal to the subscriber information inquiry signal to the switching unit 12, regardless of whether it has received the service-on-signal from the service control unit 14. Further, the service control unit 14 may be integrated with the nuisance call blocking service center 30 and the voice mail service center 32.

As detailed above, the mobile communication service control system and the mobile communication service control method according to the present invention obviate the need for the service control unit's inquiring of the home location register the necessary information, prior to the start of control of the services.

What is claimed is:

1. A mobile communication service control system comprising:
    a home location register storing subscriber information;
    a switching unit for sending to said home location register a subscriber information inquiry signal to inquire about said subscriber information upon processing of an incoming call; and
    a service control unit for controlling a service provided for subscribers,
    wherein said home location register stores service information necessary for a start of control of said service at said service control unit and sends said service information along with a response signal to said subscriber information inquiry signal to said switching unit,
    wherein said switching unit transfers said service information received from said home location register, to said service control unit,
    wherein said service control unit starts the control of said service when receiving said service information from said switching unit,
    wherein when a service available for a subscriber is on, said service control unit sends a service-on-signal to said home location register, and
    wherein said home location register sends said service information along with the response signal to said subscriber information inquiry signal to said switching unit only when receiving said subscriber information inquiry signal in a received state of said service-on-signal.

2. The mobile communication service control system according to claim 1,
    wherein said home location register controls a predetermined register-side service, wherein said service information indicates whether said register-side service controlled at said home location register is on, and
    wherein when said service information indicates that said register-side service is on, said service control unit, having received said service information, controls said register-side service in place of said home location register.

3. The mobile communication service control system according to claim 2,
    wherein said service control unit controls at least a service with a higher priority for a start of control than that of said register-side service,
    wherein said service information indicates whether said register-side service controlled at said home location register is on, and,
    wherein when said service information indicates that said register-side service is on, said service control unit, having received said service information, controls said register-side service in place of said home location register after the service control unit confirms that the service with the higher priority for the start of control than that of said register-side service is off or when a telecommunications circuit is still maintained after completion of the control of the service with the higher priority.

4. The mobile communication service control system according to claim 3,
    wherein said register-side service controlled at said home location register is a service of disconnecting the telecommunications circuit unless a mobile communication terminal displays a phone number of the communication terminal, and
    wherein the service with the higher priority for the start of control than that of said register-side service, controlled at said service control unit, is a service of disconnecting a telecommunications circuit when the phone number of the mobile communication terminal coincides with a predetermined phone number.

5. The mobile communication service control system according to claim 2,
    wherein when said home location register receives said subscriber information inquiry signal without reception of said service-on-signal, said home location register controls said register-side service without sending said service information to said switching unit.

6. The mobile communication service control system comprising:
    a home location register storing subscriber information;
    a switching unit for sending to said home location register a subscriber information inquiry signal to inquire about said subscriber information upon processing of an incoming call; and
    a service control unit for controlling a service provided for subscribers,
    wherein said home location register stores service information necessary for a start of control of said service at said service control unit and sends said service information along with a response signal to said subscriber information inquiry signal to said switching unit,
    wherein said switching unit transfers said service information received from said home location register, to said service control unit,
    wherein said service control unit starts the control of said service when receiving said service information from said switching unit,
    wherein said home location register controls a predetermined register-side service and incorporates information about whether said register-side service is on, into said service information,
    wherein said service control unit stores priority data indicating which is to be more preferentially started to control between said register-side service controlled at said home location register and said service controlled at said service control unit, and
    wherein said service control unit determines a service to be started to control, based on said service information and said priority data.

7. A mobile communication service control system comprising:
    a home location resister storing subscriber information;

a switching unit for sending to said home location register a subscriber information inquiry signal to inquire about said subscriber information upon processing of an incoming call; and a service control unit for controlling a service provided for subscribers, wherein said home location register stores service information necessary for a start of control of said service at said service control unit and sends said service information along with a response signal to said subscriber information inquiry signal to said switching unit, wherein said switching unit transfers said service information received from said home location register, to said service control unit, wherein said service control unit starts the control of said service when receiving said service information from said switching unit, wherein said service information is accompanied by a specific identifier indicating succession of said service information and by data length information about a data length of said service information, and wherein when said switching unit determines that the information received from said home location register includes said specific identifier, said switching unit transfers information successive to said data length information by said data length, to said service control unit.

8. A mobile communication service control method of controlling a service by cooperation of a home location register storing subscriber information, a switching unit for sending to said home location register a subscriber information inquiry signal to inquire about said subscriber information upon processing of an incoming call, and a service control unit for controlling a service provided for subscribers, the method comprising:

storing in said home location register service information necessary for a start of control of said service at said service control unit; and sending with the home location register said service information along with a response signal to said subscriber information inquiry signal to said switching unit, wherein said switching unit transfers said service information received from said home location register, to said service control unit, wherein said service control unit starts the control of said service when receiving said service information from said switching unit, wherein said home location register controls a predetermined register-side service and incorporates information about whether said register-side service is on, into said service information, wherein said service control unit stores priority data indicating which is to be more preferentially started to control between said register-side service controlled at said home location register and said service controlled at said service control unit, and wherein said service control unit determines a service to be started to control, based on said service information and said priority data.

9. A mobile communication service control method of controlling a service by cooperation of a home location register storing subscriber information, a switching unit for sending to said home location register a subscriber information inquiry signal to inquire about said subscriber information upon processing of an incoming call, and a service control unit for controlling a service provided for subscribers, the method comprising:

storing in said home location register service information necessary for a start of control of said service at said service control unit; and sending with the home location register said service information along with a response signal to said subscriber information inquiry signal to said switching unit, wherein said switching unit transfers said service information received from said home location register, to said service control unit, wherein said service control unit starts the control of said service when receiving said service information from said switching unit wherein when a service available for a subscriber is on, said service control unit sends a service-on-signal to said home location register, and wherein said home location register sends said service information along with the response signal to said subscriber information inquiry signal to said switching unit only when receiving said subscriber information inquiry signal in a received state of said service-on-signal.

10. The mobile communication service control method according to claim 9, wherein said home location register controls a predetermined register side service, wherein said service information indicates whether said register-side service controlled at said home location register is on, and wherein when said service information indicates that said register-side service is on, said service control unit, having received said service information, controls said register-side service in place of said home location register.

11. The mobile communication service control method according to claim 10, wherein said service control unit controls at least a service with a higher priority for a start of control than that of said register-side service, wherein said service information indicates whether said register-side service controlled at said home location register is on, and, wherein when said service information indicates that said register-side service is on, said service control unit, having received said service information, controls said register-side service in place of said home location register after the service control unit confirms that the service with the higher priority for the start of control than that of said register-side service is off or when a telecommunications circuit is still maintained after completion of the control of the service with the higher priority.

12. The mobile communication service control method according to claim 11, wherein said register-side service controlled at said home location register is a service of disconnecting the telecommunications circuit unless a mobile communication terminal displays a phone number of the communication terminal, and wherein the service with the higher priority for the start of control than that of said register-side service, controlled at said service control unit, is a service of disconnecting a telecommunications circuit when the phone number of the mobile communication terminal coincides with a predetermined phone number.

13. The mobile communication service control method according to claim 10, wherein when said home location register receives said subscriber information inquiry signal without reception of said service-on-signal, said home location register controls said register-side service without sending said service information to said switching unit.

14. A mobile communication service control method of controlling a service by cooperation of a home location register storing subscriber information, a switching unit for sending to said home location register a subscriber information inquiry signal to inquire about said subscriber information upon processing of an incoming call, and a service control unit for controlling a service provided for subscribers, the method comprising:

storing in said home location resister service information necessary for a start of control of said service at said service control unit; and sending with the home location register said service information along with a response signal to said subscriber information inquiry signal to said switching unit, wherein said switching unit transfers said service information received from said home location register, to said service control unit, wherein said home location register controls a predetermined register-side service and incorporates information about whether said register-side service is on, into said service information, wherein said service control unit stores priority data indicating which is to be more preferentially started to control between said register-side service controlled at said home location register and said service controlled at said service control unit, and wherein said service control unit determines a service to be started to control, based on said service information and said priority data.

15. A mobile communication service control method of controlling a service by cooperation of a home location register storing subscriber information, a switching unit for sending to said home location register a subscriber information inquiry signal to inquire about said subscriber information upon processing of an incoming call, and a service control unit for controlling a service provided for subscribers, the method comprising:

storing in said home location register service information necessary for a start of control of said service at said service control unit; and sending with the home location register said service information along with a response signal to said subscriber information inquiry signal to said switching unit, wherein said switching unit transfers said service information received from said home location register, to said service control unit, wherein said service information is accompanied by a specific identifier indicating succession of said service information and by data length information about a data length of said service information, and wherein when said switching unit determines that the information received from said home location register includes said specific identifier, said switching unit transfers information successive to said data length information by said data length, to said service control unit.

* * * * *